United States Patent [19]

Quella et al.

[11] 4,414,241

[45] Nov. 8, 1983

[54] METHOD FOR LUBRICATING BEARING AND GEAR SURFACES

[75] Inventors: Ferdinand Quella, Gauting; Eugen Hohmann, Bensheim, both of Fed. Rep. of Germany

[73] Assignee: Siemens Aktiengesellschaft, Berlin & Munich, Fed. Rep. of Germany

[21] Appl. No.: 343,863

[22] Filed: Jan. 29, 1982

[30] Foreign Application Priority Data

Feb. 19, 1981 [DE] Fed. Rep. of Germany ....... 3106184

[51] Int. Cl.$^3$ .............................................. B05D 1/36
[52] U.S. Cl. .......................................... 427/2; 252/12; 252/25; 427/418; 427/409
[58] Field of Search ............. 252/12, 25; 308/DIG. 9, 308/201; 427/405, 409, 2, 417, 418, 388.1; 106/15.05

[56] References Cited

U.S. PATENT DOCUMENTS

| | | | |
|---|---|---|---|
| 3,238,601 | 3/1966 | White | 427/405 X |
| 3,380,843 | 4/1968 | Davis | 252/12 |
| 3,529,875 | 9/1970 | McKee | 308/201 |
| 3,574,658 | 4/1971 | Fulk et al. | 252/12 |
| 3,942,230 | 3/1976 | Nalband | 427/405 X |
| 4,239,632 | 12/1980 | Baile | 252/12 |
| 4,314,850 | 2/1982 | Watanabe et al. | 106/15.05 X |

OTHER PUBLICATIONS

H. Worchnowski et al., "Concerning Adsorption of Poly-n-Butylmethacrylate From Solution" Schmiertechnik & Tribologie, vol. 27 (1980) pp. 47–50.

*Primary Examiner*—Michael R. Lusignan
*Assistant Examiner*—Mary Beth Fennell
*Attorney, Agent, or Firm*—Hill, Van Santen, Steadman & Simpson

[57] ABSTRACT

Long-term lubrication of highly loaded lubricating areas or surfaces, such as in very high speed medical and/or dental equipment, is obtained by applying a synthetic film, for example composed of poly(fluoroacrylic acid methyl ester) onto the sliding/moving surfaces, along with a polar oil having high lubricity. Anti-microbial agents can be added to the synthetic film. A pre-coat of molybdenum sulfide ($MoS_2$) can be provided for the synthetic film. Stationary surface abutting the sliding/moving surfaces, such as cages for ball-bearings, preferably composed of a phenol resin, can function as a reservoir for the anti-microbial agents and the oil.

19 Claims, No Drawings

METHOD FOR LUBRICATING BEARING AND GEAR SURFACES

FIELD OF THE INVENTION

The invention relates to methods of lubricating moving/sliding surfaces and somewhat more particularly to a method of lubricating bearings, gears, hand and angle pieces, high-speed turbine bearings and the like in medical and or dental equipment.

PRIOR ART

Lubricants are designed to reduce, as much as possible, the friction generated by machine parts, such as metal parts, moving against one another. With high surface pressures and parts moving very quickly relative to one another, special lubrication techniques are required. In wear-free hydrodynamic lubrication, hydrodynamic lubricating wedges separate moving members from one another.

Long-term lubrication of moving/sliding parts, bearings and ball-bearings, is still a problem, particularly in medical devices operating at very high speeds of, for example, more than 20,000 rpm (for example, a dental angle piece) up to the extreme case of 350,000 rpm and higher, with, for example, hand pieces (turbines) in dental equipment. In this type of environment, the lubrication must meet the following demands:

hydrodynamic lubrication (viscous friction);
adhesion of the lubricant to the moving surface, even when such surface is under high centrifugal forces;
high temperature stability of the lubricant; and
low and constant viscosity of the lubricant even under load.

Standard lubrication technology provides only short useful lives of turbines in long-term tests; typically, the ball-bearings fall out due to gear scuffing. Surprisingly, fluroidated oils with high thermal stabililty or a combination thereof with other lubricating materials produce no noteworthy improvements in the useful life of equipment lubricated with such oils.

Dental drives, such as extremely high speed, air-driven turbines with speeds up to 500,000 rpm, electrically and/or pneumatically driven hand and angle pieces with a speed ranging from 100 rpm through 200,000 rpm and air motors with speeds up to 50,000 rpm require intensive maintenance of their respective bearings and of the associated gears for a faultless, low-wear operation. Present maintenance occurs by a lubricating program which must be executed several times a day. Generally, a lubricant in a pressurized spray can is applied to friction-generating surfaces. Submersion lubrication, particularly with hand and angle pieces, is also utilized as a standard lubricating technique.

It is known [for example, see H. Wochnowski and B. Muessig "Schmiertechnik+Tribologie" (Lubrication Technology and Tribology), Vol. 27 (1980) pgs. 47–50] that additions of polymers to friction surfaces provide a significant reduction of wear. Commercially available, epilamization agents (i.e., surface coating agents in combination with oils) are also based on this effect. In instances of all polymer additives to lubrication oils, however, a mechanical communication of the polymers (degradation) due to shearing occurs. In the case of hydraulic lubricants, there is even an industrial standard, DIN 51382, for determining the constant viscosity drop which occurs due to shearing of polymer additives. According to the above-referenced publication, it has even been observed that polymer containing oils sometimes even produce higher wear than do unaltered oils and that even the apparent viscosity drop (as determined by the above industry standard) can lead to the fact that one proceeds from an area of hydrodynamic lubrication into that of mixed friction.

The effectiveness of polymer additives in lubricating problems for precision mechanics can be explained in that one is in the mixed friction area in nearly all lubrications. In this area, the viscosity (and thus viscosity drop) has no significant function. It is only chemical properties, such as adhesion to the lubrication surface, for example, the surfaces of ball-bearings, which are decisive. However, the mixed friction area cannot be reached at all with high speeds, because a far too large heating would occur due to friction losses.

SUMMARY OF THE INVENTION

The invention provides a method of lubrication sliding/moving surfaces, such as bearings, hand and angle pieces, high speed turbine bearings, and the like, which overcome the prior art drawbacks.

In accordance with the principles of the invention sliding/moving surfaces are lubricated by applying a film of a poly (fluoroacrylic acid methyl ester) polymer such as a fluoropolymer, to the lubricating surfaces, for example by immersing such surfaces in a solution containing about 0.1 through 10% by weight of the polymer and thereafter lubricating the so-coated surfaces with a polar oil exhibiting high lubricity.

By practicing the principles of the invention, load transmission due to oscillation and shearing is completely intercepted by the known lubricant and is not transmitted to the polymer film. For example, ball bearings treated in accordance with the principles of the invention achieved a maintenance-free running time of up to 40 hours in turbine environments, i.e. with speeds of 350,000 rpm. In traditional maintenance technology, times of up to only a maximum of 6 hours have heretofore been achieved.

In accordance with a preferred embodiment of the invention, a polar oil is utilized which exhibits a viscosity of 10 through 150 $mm^2/s$ at 40° C. Preferably, such oil is selected from the group consisting of natural fatty oils (for example, a glycide ester) long-chain mono- or di-carboxylic acid esters (for example, Adipat, a commercially available adipic acid ester; Sebacat, a commercially available sebacic acid ester, etc.) and mixtures thereof. Internal friction losses are kept very small by means of the relatively low viscosity exhibit by such oils.

In certain embodiments of the invention, a polar oil is utilized which at least partially exhibits liquid crystal characteristics. Due to the particular structure of liquid crystal systems, energy can be intercepted to such a degree by an internal shifting of the lattice layers that energy is only slightly transmitted to the polymer layer.

The principles of the invention are useful not only to reduce the maintenance outlay for the earlier described drives, hand and angle pieces, etc., in medical/dental equipment, but also to prevent infection of such equipment with microorganisms. A lubricant program which is carried out only once a week or only once a month would be greatly beneficial since it would greatly reduce the maintenance outlay for a user and would increase the operational reliability of a given instrument system, for example, a drill system.

In order to obtain this relatively infrequent lubrication, an anti-microbial agent, for example, in concentration of about 0.1 through 5% by weight relative to the polymer, can be added. In preferred embodiments, the polymer, polyfluoroacrylic acid methyl ester is applied in a layer thickness of 0.5 through 10 $\mu$m.

Hygienic requirements for preventing the growth of micro-organisms on the inside of a drill or for sterilizing a dental hand piece are achieved by the addition of an anti-microbial agent. In a long-term lubrication, the latter demand requires a synthetic film, for example, comprised of a combination of a fluoropolymer and a polar oil, for example, Adipat, Sebacat, a fluoridated oil, etc., which can withstand a sterilization temperature of at least 130° C.

In certain embodiments of the invention, the anti-microbial agent utilized is, for example, an additive available under the trademark "Preventol A3" (containing N- (fluorodichloromethyl-thiophthalimide as the active agent) which has a high microorganism band width. In this manner, the growth of microorganisms is prevented. The fluoropolymer by itself is relatively unsuitable for this purpose because of its low compatibility with other organic additives. These anti-microbial additives can be introduced into a polymer surface composed of more compatible polymers, such as polyesters, polyoxymethylenes or polyimides.

In instances when it is not possible to reach the lubricating area or surfaces for the entire useable life of a device with a single lubricating step, the lubricant must be stripped from the lubricating areas/surfaces and must be subsequently reintroduced. With a layer structure comprised of a polymer film and an oil, the film must be applied first and the oil must be introduced during a second step. If a re-lubrication is necessary, for example, after an operating time of one year in the course of standard maintenance, the polymer film can be dissolved-out, for example, with a fluoridated solvent, a new polymer film can be sprayed-on, as with a spray can, and, thereafter a re-oiling can be carried out.

In accordance with certain embodiments of the invention, a mixture comprised of a synthetic polymer material, for example, a fluoropolymer, such as a poly (fluoroacrylic acid methyl ester) and a suitable solvent or a mixture comprised of a dissolved polymer material, a suitable solvent and anti-microbial agent, for example, "Preventol A3," can be filled into a conventional pressurized spray can for purposes of a simple after-treatment of the friction-generating surfaces. In this manner, after-treatments can be readily carried out so that maintenance intervals can be extended.

In instances of very high bearing load, as during start-ups, or when decelerating, contact can occur between ball surfaces and the bearing ring or cage. In these instances, a solid layer must be present on the moving surfaces which can replace any missing lubricant film. These emergency running properties are obtained, for example, in accordance with a further embodiment of the invention by providing a layer consisting of molybdenum sulfide, $MoS_2$, as a pre-coat for the polymer film. This pre-coat is peferably applied in a layer thickness of 0.5 $\mu$m through 10 $\mu$m. This layer thickness can be achieved by applying $MoS_2$ by sputtering or by physical vapor deposition (PVD). This $MoS_2$ layer can also function as a reservoir for the polar oil and the anti-microbial agent. The combination of a polymer film and a $MoS_2$ layer allows the oil and anti-microbial agent to post-difuse at the lubricating areas or surfaces and ensures that the $MoS_2$ layer will be effective in emergencies. With a polymer comprised of a fluoropolymer, direct diffusion of other materials through the polymer film is slight. In this instance, oil and the anti-microbial agent are transported out of their reservoir (i.e. $MoS_2$ layer) by means of kneading, particularly during start-ups or deceleration.

In a further embodiment of the invention, the stationary surfaces (such as forming roller bearing cage surfaces) in working relation or abutting to the sliding/moving surfaces, such as a cage surrounding moving parts, particularly ball bearings, is composed of a porous material. Preferably, such porous material is selected from a group consisting of unfilled phenolic resins, phenolic resins filled with a heat-dissipating material, sintered materials, ceramics, aluminum, magnesium and glass-ceramics. This porous material can function as a reservoir for the lubricant (oil) and the anti-microbial additive. It has been noted that a cage composed of phenolic resin in its simplest form is an excellent carrier for anti-microbial agents. Such cage can absorb oil and the anti-microbial agents and slowly emit them to their surroundings, for example, the surface requiring lubrication. Sintered materials, such as tin-bronze and/or porous glass, which must all be stable in form, easy to work and have a relatively low specific weight, can also be utilized as materials for these stationary surfaces provided about the sliding/moving surfaces.

A further reservoir for the lubricant and the anti-microbial agents can be incorporated into a coating of a porous material such a $MoS_2$, applied to surfaces receiving lubrication, for example, ring and ball surfaces. When $MoS_2$ is applied (in a layer thickness of about 0.5 to 10 $\mu$m), for example, with physical vapor deposition techniques, a bearing so-coated exhibits emergency running properties. The anti-microbial agent and the oil can be re-supplied from this porous layer.

Additional combinations with the polymer film produces further possibilities.

1. Oil and anti-microbial additive agent post-diffuse.
2. Polymer film and oil are effective in a normal case.
3. Even with a fluoropolymer, the oil and the anti-microbial agent can be kneaded-out of their reservoir by flexing.

Under standard loads, a bearing should last several years. Even when a required useful life is normally achieved with one lubrication, one must sometimes count on a shorter useful life with frequent load applications. In order to do justice in such instances, the polymer and oil can be removed within a framework of standard maintenance work, for example, after a year (being removed, for example, with Freon, a commercially available halogenated hydrocarbon) and the polymer film can then be reapplied and provided with oil. This, likewise, represents a significant simplification of present day lubricating operations.

According to certain embodiments of the invention, the stationary surface or cage about the sliding/moving surface is composed, for example, of a phenolic resin containing a heat-dissipating material. It has been shown in lubricating tests that, for example, a phenolic resin cage is subject to particular thermal loads when it runs a long time. Whereas other components hardly exhibit any damage, the cage is thermally loaded to a particular degree. The thermal load can be significantly reduced by adding heat-dissipating materials, such as, for example, aluminum powder, in an amount ranging from 0 through 25% by weight, relative to the resin.

DESCRIPTION OF THE PREFERRED EMBODIMENTS

With the foregoing general discussion in mind, there is presented a detailed exemplary embodiment which will illustrate to those skilled in the art the manner in which the invention is carried out. However, this example is not to be construed as limiting the scope of the invention in any manner.

EXEMPLARY EMBODIMENT

Degreased bearings and gear parts of drives and hand/angle pieces are immersed in a solution containing about 0.1 through 10% by weight of a poly (fluoroacrylic acid methyl) ester. After the readily volatile solvent has been evaporated, a polymer film remains on the surfaces of the bearings and gears. This polymer film has the property of retaining subsequently introduced lubricants, such as a polar oil. Standard known epilamization agents (surface coating agents applied from a solution, in combination with an oil for improving surface lubricity) can be utilized to produce the polymer film. After that, lubrication is carried out, for example with a glycide ester (having a viscosity of approximately 30 mm$^2$/s at 50° C.).

Another means of extending the maintenance intervals consist of applying a lubricant containing MoS$_2$. Application of MoS$_2$ can occur by sputtering or by means of physical vapor deposition (PVD) so as to obtain a layer thickness of about 0.5 through 10 μm.

As is apparent from the aforegoing specification, the present invention is susceptible of being embodied with various alterations and modifications which may differ particularly from those that have been described in the preceding specification and description. For this reason, it should be fully understood that all of the foregoing is intended to be merely illustrative, it is not to be constured or interpreted as being restrictive or otherwise limiting the present invention, excepting as it is set forth and defined in the hereto-appended claims.

We claim as our invention:

1. In a method of lubricating sliding/moving surfaces such as bearings, hand and angle pieces, high-speed turbine bearings and the like, the improvement comprising:
    applying a film of a poly (fluoroacrylic acid methyl ester) polymer out of a solution containing about 0.1 through 10% by weight of said polymer to the lubricating surface so as to attain a laye thickness of about 0.5 through 10 μm of said polymer on said lubricating surface; and
    thereafter lubricating the resultant surfaces with a polar oil exhibiting high lubricity.

2. In a method as defined in claim 1 wherein said polar oil exhibits a viscosity of 10 through 150 mm$^2$/s at 40° C. and is selected from the group consisting of natural fatty oils, long-chained monocarboxylic acids, long-chained dicarboxylic acids and mixtures thereof.

3. In a method as defined in claim 1 wherein said polar oil exhibits, at least partially, liquid crystal characteristics.

4. In a method as defined in claim 1 wherein an anti-microbial agent is added to said polymer.

5. In a method as defined in claim 4 wherein said anti-microbial agent is added in a concentration of about 0.1 through 5% by weight, relative to said polymer.

6. In a method as defined in claim 4 wherein said anti-microbial agent comprises N-(fluorodichloromethyl-thiophthalimide).

7. In a method as defined in claim 1 wherein said polymer is dissolved in a compatible readily volatile solvent in a weight amount of 0.1 through 10% to obtain a solution from which a polymer film is applied.

8. In a method as defined in claim 7 wherein an anti-microbial agent is added to said solution.

9. In a method as defined in claim 8 wherein said anti-microbial agent is added in a concentration of about 0.1 through 5% by weight, relative to said polymer.

10. In a method as defined in claim 1 wherein said polymer is dissolved in a compatible solvent to obtain a solution and said solution is filled into a pressurized spray can for simple after-treatment of the initially lubricated surfaces so as to obtain an improved lifetime of said surfaces.

11. In a method as defined in claim 1 wherein said polymer is dissolved in a compatible solvent, along with an anti-microbial agent, to obtain a solution, and the resultant solution is filled into a pressurized spray can for simple after-treatment of the initially lubricated surfaces so as to obtain an improved lifetime of said surfaces.

12. In a method as defined in claim 1 wherein, prior to application of said polymer film to said surfaces, a layer of molybdenum sulfide in a thickness of about 0.5 through 100 μm is applied to such surfaces as a precoating for said polymer film.

13. In a method as defined in claim 12 wherein said molybdenum sulfide layer is provided with an anti-microbial agent and oil.

14. In a method as defined in claim 12 wherein said molybdenum sulfide layer is applied by sputtering techniques.

15. In a method as defined in claim 12 wherein said molybdenum sulfide layer is applied by physical vapor deposition techniques.

16. In a method as defined in claim 1 wherein roller bearing cage surfaces in working relation with said sliding/moving surfaces are composed of a porous material selected from the group consisting of unfilled phenolic resins, phenolic resins filled with a heat-dissipating material, sintered materials, ceramics, aluminum, magnesium, and glass-ceramics, said roller cage surfaces functioning as a reservoir for said oil.

17. In a method as defined in claim 16 wherein an anti-microbial agent is added to said oil and said roller bearing cage surfaces function as a reservior for said oil and anti-microbial agent.

18. In a method of lubricating sliding/moving surfaces such as bearings, hand and angle pieces, high-speed turbine bearings and the like, the improvement comprising:
    applying a layer of molybdenum sulfide to said surfaces in a layer thickness of about 0.5 through 10 μm;
    applying a film of a poly (fluoroacrylic acid methyl ester polymer out of a solution containing about 0.1 through 10% by weight of said polymer to said molybdenum sulfide layer in a layer thickness of about 0.5 through 10 μm; and
    lubricating the resultant surface with a polar oil exhibiting a viscosity of about 10 through 150 mm$^2$/s at 40° C. and selected from the group consisting of natural fatty oils, long-chained monocarboxylic acids, long-chained dicarboxylic acids and mixtures thereof.

19. In a method of lubricating sliding/moving surfaces such as bearings, hand and angle pieces, high-speed turbine bearings and the like, the improvement comprising:
dissolving a poly (fluoroacrylic acid methyl ester) polymer in a compatible, readily volatile solvent in a weight amount of about 0.1 through 10% to obtain a solution from which film of said polymer can be applied;
applying a film of said polymer from said solution to said surfaces in a layer thickness of about 0.5 through 10 μm while evaporating said volatile solvent; and
lubricating the resultant surface with a polar oil exhibiting a viscosity of about 10 through 150 mm$^2$/s at 40° C.

* * * * *